United States Patent
Ross et al.

(10) Patent No.: US 12,289,503 B2
(45) Date of Patent: Apr. 29, 2025

(54) SYSTEMS, METHODS, AND APPARATUSES FOR IMPROVED FAILOVER TECHNIQUES

(71) Applicant: Comcast Cable Communications, LLC, Philadelphia, PA (US)

(72) Inventors: Adam Ross, Louisville, CO (US); Landon Baxter, Lafayette, CO (US); Andrew Morrow, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 363 days.

(21) Appl. No.: 17/133,198

(22) Filed: Dec. 23, 2020

(65) Prior Publication Data

US 2022/0201366 A1 Jun. 23, 2022

(51) Int. Cl.
| | |
|---|---|
| *H04N 7/173* | (2011.01) |
| *H04N 21/435* | (2011.01) |
| *H04N 21/437* | (2011.01) |
| *H04N 21/462* | (2011.01) |
| *H04N 21/647* | (2011.01) |
| *H04N 21/8547* | (2011.01) |

(52) U.S. Cl.
CPC ....... *H04N 21/6473* (2013.01); *H04N 21/435* (2013.01); *H04N 21/437* (2013.01); *H04N 21/4622* (2013.01); *H04N 21/8547* (2013.01)

(58) Field of Classification Search
CPC ............. H04N 21/6473; H04N 21/435; H04N 21/437; H04N 21/4622; H04N 21/8547; H04N 21/2343; H04N 21/4825; H04N 21/8456

See application file for complete search history.

(56) References Cited

U.S. PATENT DOCUMENTS

| | | | |
|---|---|---|---|
| 6,744,815 B1 * | 6/2004 | Sackstein | H04N 21/23406 348/521 |
| 9,936,229 B1 * | 4/2018 | Wagenaar | H04N 21/23106 |
| 11,140,429 B1 * | 10/2021 | Johnson | H04N 21/23655 |
| 2002/0067909 A1 * | 6/2002 | Iivonen | H04N 21/4782 348/E7.063 |
| 2013/0120590 A1 * | 5/2013 | Clark | H04N 17/004 348/192 |
| 2014/0059244 A1 * | 2/2014 | Panje | H04N 21/26258 709/231 |
| 2014/0195631 A1 * | 7/2014 | Pandit | G06F 13/28 709/212 |
| 2015/0089557 A1 * | 3/2015 | Busse | H04N 21/8456 725/95 |
| 2016/0248835 A1 * | 8/2016 | Petrangeli | H04L 65/65 |
| 2016/0373821 A1 * | 12/2016 | Nair | H04N 21/8456 |

(Continued)

*Primary Examiner* — Annan Q Shang
(74) *Attorney, Agent, or Firm* — Ballard Spahr LLP

(57) ABSTRACT

Methods and systems for improved failover techniques are described herein. A failure associated with a content source may lead to a computing device becoming unable to output all or part of content that was requested from the content source prior to the failure. The computing device may have received a portion of a manifest associated with the content prior to the failure. The failover techniques described herein may enable the computing device to continue receiving portions of the content despite the failure. For example, an additional portion of the manifest may be modified such that the computing device may request additional portions of the content from another content source without requiring a retuning procedure.

20 Claims, 7 Drawing Sheets

(56) References Cited

U.S. PATENT DOCUMENTS

| | | | |
|---|---|---|---|
| 2017/0126256 A1* | 5/2017 | Salomons | H03M 13/353 |
| 2017/0134466 A1* | 5/2017 | Giladi | H04N 21/26258 |
| 2018/0352274 A1* | 12/2018 | Pantos | H04N 21/4305 |
| 2019/0104326 A1* | 4/2019 | Stockhammer | H04N 21/6377 |
| 2020/0045351 A1* | 2/2020 | Paixao | H04L 65/613 |
| 2021/0099746 A1* | 4/2021 | Sodagar | H04N 21/26208 |
| 2021/0385522 A1* | 12/2021 | Giladi | H04N 21/2362 |
| 2022/0038789 A1* | 2/2022 | Giladi | H04L 65/65 |
| 2022/0070243 A1* | 3/2022 | Hartnett | H04N 21/44222 |
| 2022/0083628 A1* | 3/2022 | Mangalore | H04L 63/062 |

\* cited by examiner

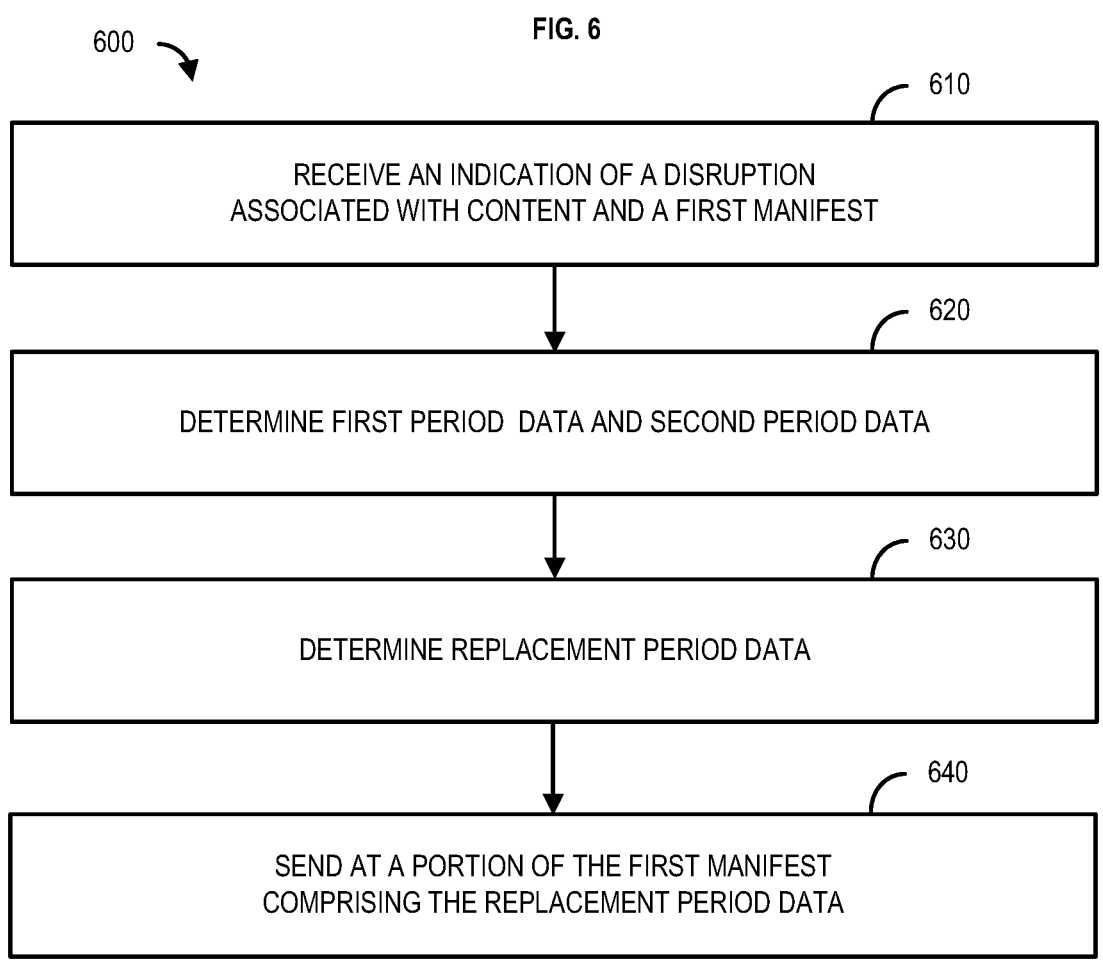

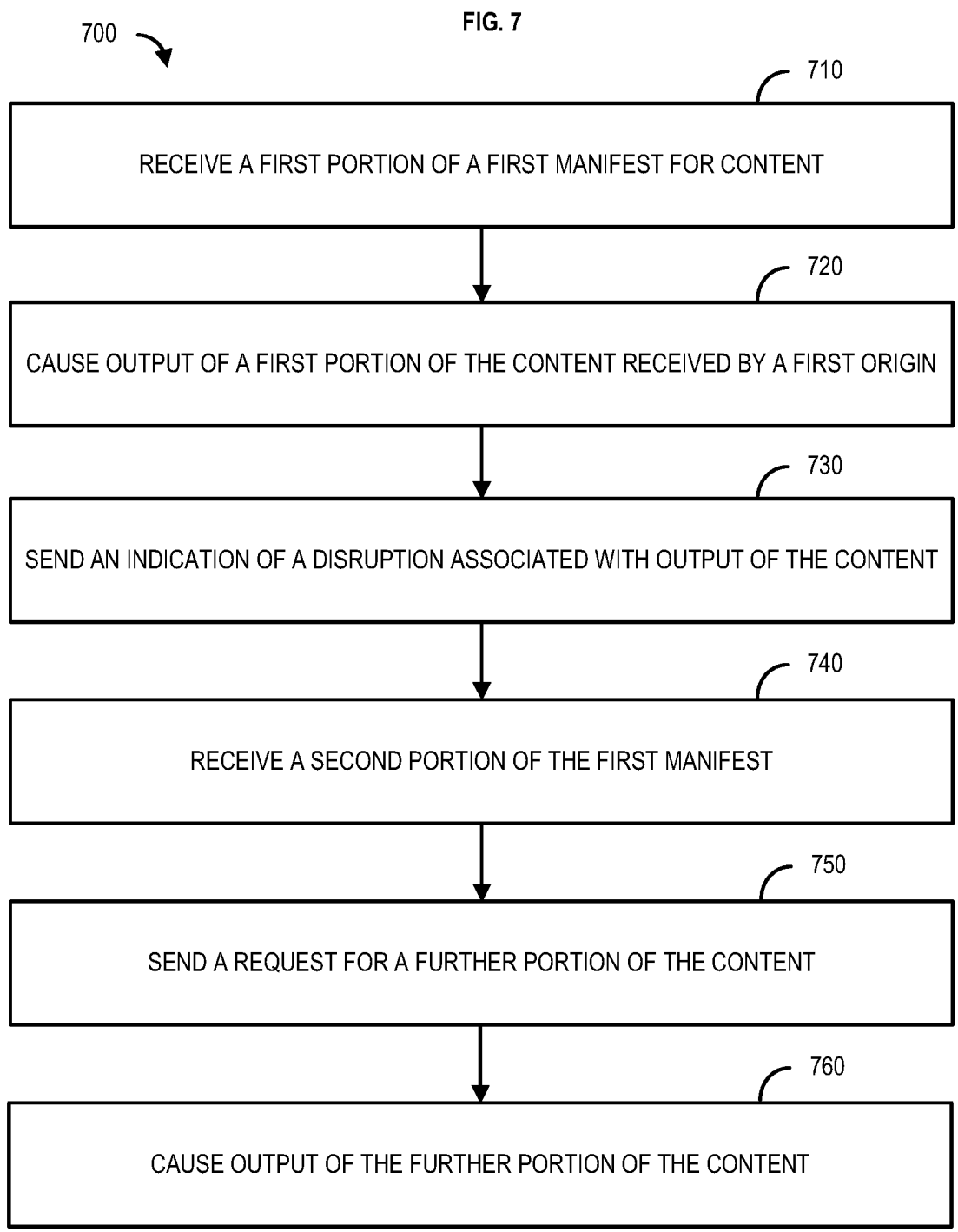

SYSTEMS, METHODS, AND APPARATUSES FOR IMPROVED FAILOVER TECHNIQUES

BACKGROUND

Uninterrupted delivery of content to media devices is crucial for an overall positive user experience. If a failure associated content delivery occurs, remedial actions may be taken to mitigate the effects of the failure. Such actions may be referred to as "failover" techniques. Existing failover techniques relating to failures associated with origins (e.g., sources) of content often require media devices (e.g., content players) to initiate a retuning procedure, which may result in a delay in receiving content and/or other undesirable effects on the user experience.

SUMMARY

It is to be understood that both the following general description and the following detailed description are exemplary and explanatory only and are not restrictive. Methods, systems, and apparatuses for improved failover techniques are described herein. A content source within a network, such as a server, may fail for a variety of reasons, such as a hardware failure(s), a software failure(s), a communication pathway failure(s), a combination thereof, and/or the like. The failure associated with the content source may lead to a computing device, such as a user/media device, becoming unable to output (e.g., display, present) all or part of content that was requested from the content source prior to the failure. The computing device may have received a portion of a manifest associated with the content prior to the failure. Continued use of the portion of the manifest received prior to the failure may result in a retuning procedure and may degrade the user experience. The failover techniques described herein enable the computing device to continue receiving portions of the content despite the failure and without the need for a retuning procedure. For example, an additional portion of the manifest may be modified such that the computing device may request additional portions of the content from another content source without requiring a retuning procedure. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 6 shows a flowchart for an example method;
and
FIG. 7 shows a flowchart for an example method.

DETAILED DESCRIPTION

Figure 1:
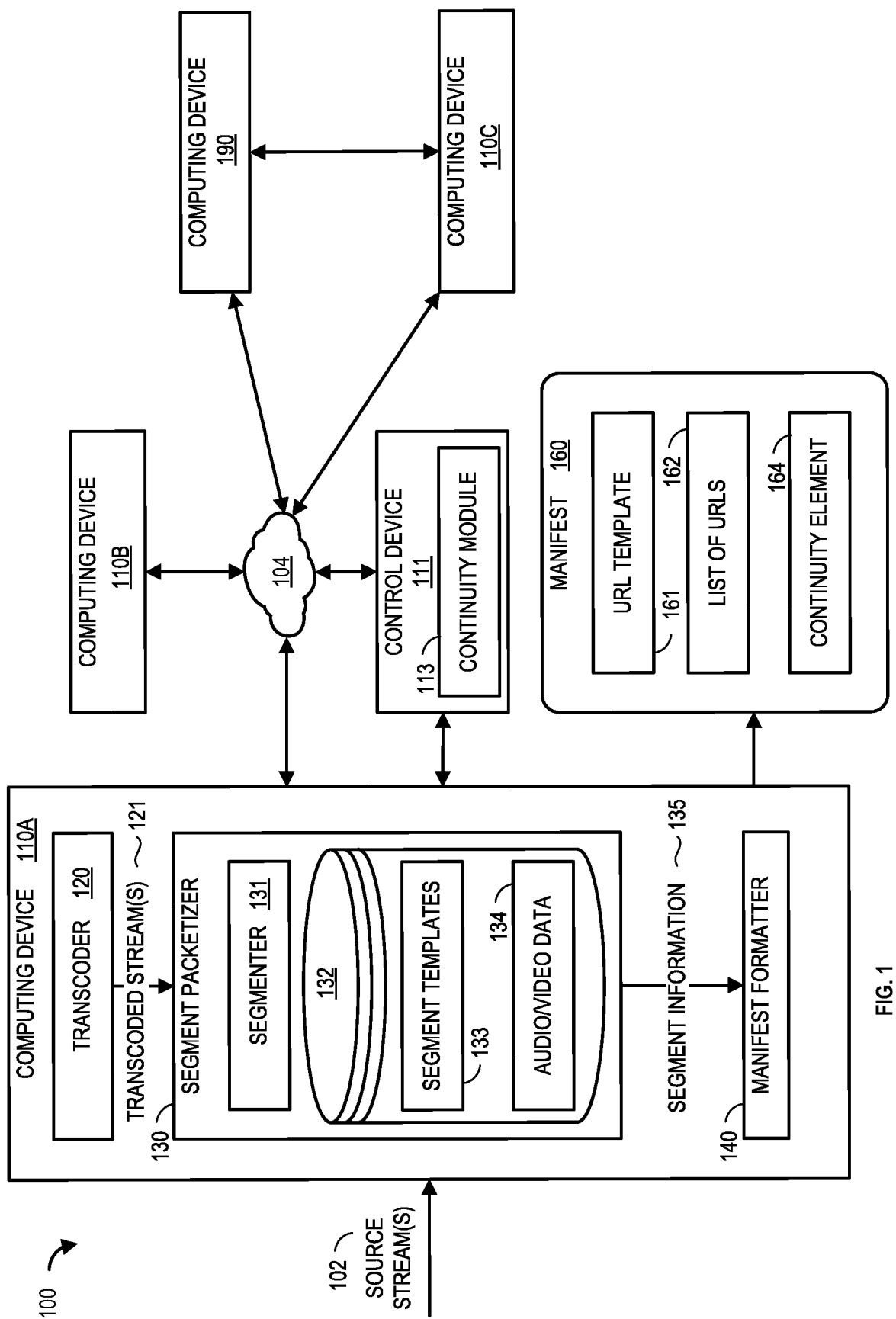
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for improved failover techniques are described herein. Remedial actions taken to mitigate effects of a failure(s) of a computing device and/or component within a network may be referred to as "failover" techniques. An example failure that may disrupt content delivery concerns origins of content. An origin computing device may be a content server(s) or other computing device(s) that is responsible for converting raw versions of content into compressed or otherwise more "consumable" versions of content for consumer computing devices. An origin computing device may generate portions of content and/or a manifest for the content. Computing devices, such as user/media devices, may use the manifest to generate requests for one or more portions (e.g., segments) of the content. Requests for portions of the content may be sent by the computing devices to the origin and processed accordingly.

For example, a first computing device may receive an indication of a disruption associated with content requested by a second computing device (e.g., a user/media device). The first computing device may be situated between—or otherwise receive communications between—the second computing device and one or more origins (e.g., content servers) of content. The second computing device may have requested a portion(s) of the content from a first origin computing device (e.g., a content server) according to a first manifest. The disruption may be caused by a failure associated with the first origin computing device, such as a hardware failure(s), a software failure(s), a communication pathway failure(s), a combination thereof, and/or the like. The first manifest may be associated with the first origin computing device. The first manifest may indicate first timing data, such as a first presentation time stamp (PTS) associated the first origin computing device. The first PTS may be used by a packaging device (e.g., a just-in-time packager) to determine at what point in time a particular portion of the content requested by the second computing device is to be delivered to—or otherwise made available to the second computing device.

The first computing device may determine/identify a second origin computing device (e.g., another content server) that is available to serve requests for portions of the content. For example, the first computing device may determine/identify the second origin computing device as part of a failover procedure (e.g., a failover technique). A second manifest for the content may be associated with the second origin computing device. The second manifest may include second timing data indicating a second PTS associated with the second origin computing device. The second timing data may differ at least partially from the first timing data. The first computing device may modify the first manifest and/or the second manifest. For example, the first computing device may receive at least one portion of the second manifest from the second origin computing device. The at least one portion of the second manifest may comprise at least one identifier associated with at least one additional portion of the content and the second origin computing device. The at least one portion of the second manifest may comprise the second timing data associated with the second origin computing device.

The first computing device may determine replacement timing data. The first timing data may be indicative of the first PTS associated with the first origin computing device, and the second timing data may be indicative of the second PTS associated with the second origin computing device. The first computing device may determine the replacement timing data based on the first PTS and the second PTS. The first computing device may modify at least one portion of the first manifest (referred to herein as the "modified first manifest") based on the replacement timing data. The modified first manifest may comprise the at least one identifier and the replacement timing data. The first computing device may send the modified first manifest to the second computing device. The modified first manifest may enable the second computing device to receive the at least one additional portion of the content via the second origin computing device without requiring a retuning procedure.

FIG. 1 shows an example system 100 for improved failover techniques. The system 100 may comprise a content delivery network, a data network, a content distribution network, or any other network or distribution system that one skilled in the art would appreciate. The system 100 may comprise a computing device 110A in communication with a computing device 190. The computing device 110A may be an origin. An origin computing device may comprise a server (e.g., a content server) and/or a device (e.g., an encoder, decoder, transcoder, packager, etc.). An origin computing device may generate and/or output portions of content. For example, an origin computing device may convert raw versions of content (e.g., broadcast content) into compressed or otherwise more "consumable" versions suitable for playback/output by user devices, media devices, and other consumer-level computing devices. "Consumable" versions of content—or portions thereof—generated and/or output by an origin computing device may include, for example, data files adhering to H.264/MPEG-AVC, H.265/MPEG-HEVC, H.266/MPEG-VVC, MPEG-5 EVC, MPEG-5 LCEVC, AV1, MPEG2, MPEG, MPEG4 UHD, SDR, HDR, 4 k, Adobe® Flash® Video (.FLV), ITU-T H.261, ITU-T H.262 (MPEG-2 video), ITU-T H.263, ITU-T H.264 (MPEG-4 AVC), ITU-T H.265 (MPEG HEVC), ITU-T H.266 (MPEG VVC) or any other video file format, whether such format is presently known or developed in the future. For ease of explanation, the description herein may use the phrase "origin computing device" in the singular form. However, it is to be understood that an origin computing device may comprise a plurality of servers and/or a plurality devices that operate as a system to generate and/or output portions of content, convert raw versions of content (e.g., broadcast content) into compressed or otherwise more "consumable" versions, etc.

The computing device 190 may be a content/media player, a set-top box, a client device, a smart device, a mobile device, a user device, etc. The computing device 110A and the computing device 190 may communicate via a network 104. The network 104 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 104 via a variety of transmission paths, including wireless paths (e.g., satellite paths, Wi-Fi paths, cellular paths, etc.) and terrestrial paths (e.g., wired paths, a direct feed source via a direct line, etc.). While FIG. 1 shows a single computing device 190 for explanatory purposes, it is to be understood that the system 100 may comprise a plurality of computing devices that function similarly to the computing device 190.

The computing device 110A may comprise a transcoder 120, a segment packetizer 130, and/or a manifest formatter 140, each of which may correspond to hardware, software (e.g., instructions executable by one or more processors of the computing device 110A), or a combination thereof. The transcoder 120 may perform bitrate conversion, coder/decoder (CODEC) conversion, frame size conversion, etc. For example, the computing device 110A may receive a source stream 102 and the transcoder 120 may transcode the source stream 102 to generate one or more transcoded streams 121. The source stream 102 may be a live stream (e.g., a linear content stream) or a video-on-demand (VOD) stream. The computing device 110A may receive the source stream 102 from an external source (e.g., a stream capture source, a data storage device, a media server, etc.). The computing device 110A may receive the source stream 102 via a wired or wireless network connection, such as the network 104 or another network (not shown). It should be noted that although a single source stream 102 is shown in FIG. 1, this is not to be considered limiting. The computing device 110A may receive any number of source streams 102.

One or more transcoded streams 121 may correspond to a plurality of adaptive bitrate (ABR) representations of the source stream 102. For example, the transcoded streams 121 may differ from each other with respect to audio bitrate, a number of audio channels, an audio CODEC, a video bitrate, a video frame size, a video CODEC, a combination thereof, and/or the like. The one or more transcoded streams 121 may be sent to a computing device 110C (e.g., a just-in-time packager), as further described herein. For example, a source stream 102 (e.g., a mezzanine feed) may be used to generate one or more representations of a content item that have varying bitrates and/or alternative CODECs on-the-fly. As an example, a CODEC switch from an H.264/advanced audio coding (AAC) input stream to a VP8 representation and a Vorbis representation may be performed. Audio formats may be switched from a first format to another (e.g., from a surround sound format to a stereo format). The transcoder 120 may transcode the source stream 102 such that key frames (e.g., intra-coded frames (I-frames)) in each of the transcoded streams 121 occur at the same time as in the source stream 102. That is, each of the transcoded streams 121 may be "key frame aligned" to enable seamless switching between different ABR representations by a destination device (e.g., the computing device 190).

The segment packetizer 130 may comprise a segmenter 131. The segment packetizer 130 may also include (or have access to) a data storage device 132, as shown. The segmenter 131 may divide a set of ABR representations (e.g., the transcoded streams 121) into media segments. For example, the segmenter 131 may receive a target segment duration. The target duration may be, for example, approximately ten thousand milliseconds. The target segment duration may be received via user input, determined via a configuration file at the computing device 110A, determined based on properties of the source stream 102, received via the computing device 110A, a combination thereof, and/or the like. For example, if the target segment duration is ten seconds, the segmenter 131 may process the incoming transcoded streams 121 and break the transcoded streams 121 into segments at key frame boundaries approximately ten seconds apart. If the transcoded streams 121 include separate video and audio streams, the segmenter 131 may generate the segments such that the video and audio streams are timecode aligned.

The computing device 110A may support multiple content segmentation types. The segmenter 131 may generate segments for each of the content segmentation types supported by the computing device 110A. Segments may alternately be referred to as "chunks." The computing device 110A may support both multiplexed segments (video and audio data included in a single multiplexed stream) and non-multiplexed segments (video and audio data included in separate non-multiplexed streams). Further, in the case of MPEG-DASH and/or HLS, the computing device 110A may support container formats in compliance with international standards organization base media file format (e.g., ISOBMFF, associated with a file extension ".m4s"), motion picture experts group 2 transport stream (e.g., MPEG-TS), extensible binary markup language (e.g., EBML), WebM, Matroska, or any combination thereof.

The segmenter 131 may employ a "smart" storage system to avoid replicating audio/video data during generation of segments for each content segmentation type. In one example, if the computing device 110A supports N content segmentation types (where N is an integer greater than zero), the segmenter 131 may generate N segment templates 133 for each segment (e.g., ten second portion) of each of the transcoded streams 121. Each segment template 133 may comprise header information associated with a content segmentation type, data indicating a start position or start time of the segment in the source stream 102, and data indicating an end position or end time of the segment in the source stream 102. In the example of MPEG-DASH and/or HLS content, different segment templates may be generated for ISOBMFF multiplexed ("muxed"), ISOBMFF non-multiplexed ("demuxed"), MPEG-TS muxed, MPEG-TS demuxed, EBML muxed, EBML demuxed, etc. Each of the segment templates 133 may not include the underlying audio/video data 134 of the corresponding segment. For example, while multiple segment templates 133 may be generated for each segment of the source stream 102, the underlying segment audio/video data 134 may be stored once. As the segment templates 133 are generated, the segmenter 131 may generate and/or send segment information 135 regarding the segment templates 133 and send the segment information 135 to a manifest formatter 140.

During operation, the manifest formatter 140 may generate one or more manifests based on the segment information 135 received from the segment packetizer 130. In the case of MPEG-DASH and/or HLS, the manifest may be a MPEG-DASH media presentation description (MPD) file. The manifest formatter 140 may generate one or more manifests based on a manifest type and/or a content segmentation type. If the manifest type is number-based or time-based, the manifest formatter 140 may generate, based on the segment information 135, a manifest 160 that comprises a URL template 161. The URL template 161 may be number-based or time-based. A URL template 161 that is number-based may be used by the computing device 190 to construct URLs to request individual segments according to corresponding segment number. A URL template 161 that is time-based may be used by the computing device 190 to construct URLs to request individual segments according to corresponding segment start time. If the manifest type is list-based, the manifest formatter 140 may generate, based on the segment information 135, a manifest 160 that comprises a list of URLs 162. The list of URLs may include URLs that are specific to one or more segments of one or more ABR representations.

The manifest 160 may identify one or more segments of one or more adaptive streaming representations of the source stream 102. For example, the transcoded streams 121 generated by the transcoder 120 may include three ABR representations of the source stream 102: a first representation with a bit rate of 2 megabits per second (Mbps) and a frame size of 720p, a second representation with a bit rate of 750 kilobits per second (Kbps) and a frame size of 160p, and a third representation with a bit rate of 250 kbps and a frame size of 120p. More, fewer, and/or different adaptive streaming representations may be generated by the transcoder 120, where each generated adaptive streaming representation(s) may have a plurality of key frame aligned segments. The manifest formatter 140 may generate manifests based on the segment information 135 from the segment packetizer 130, including information associated with the segment(s) of the adaptive streaming representation(s) generated by the transcoder 120.

A different manifest may be generated for each computing device (e.g., computing device 190) that requests a manifest for a particular content item, even if two or more computing devices specify the same manifest type and content segmentation type. For example, the manifest 160 may be specific to the computing device 190. Each URL or URL template in the manifest 160 may include embedded session information that identifies the computing device 190. The session information may be used to uniquely identify the requester of a segment.

The system 100 may comprise a computing device 110C. The computing device 110C may be sent to a packaging device, such as a just-in-time packager. The computing device 110C may be in communication with each device shown in the system 100. The computing device 110C may receive the manifest 160 in addition to the computing device 190. The computing device 110C may receive requests for segments (e.g., portions) of a content item from the computing device 190 according to the manifest 160. The computing device 110C may retrieve corresponding transcoded segments of the content from the computing device 110A, prepare the transcoded segments for output by the computing device 190, and deliver the requested segments to the computing device 190. The manifest 160 may indicate first timing data, such as a first presentation time stamp (PTS) associated with the transcoder 120. The first PTS may be used by the computing device 110C to determine at what point in time a particular segment requested by the computing device 190 is to be delivered—or otherwise made available to—the computing device 190.

The system 100 may comprise a computing device 110B. The computing device 110B may be a content origin server(s) and/or a network of content origin servers. The computing device 110B may function similarly to the computing device 110A. For example, the computing device 110B may serve as a backup for the computing device 110A in the event the computing device 110A fails or is otherwise unable to process a request. The computing device 110A may serve as a backup for the computing device 110B in the event the computing device 110B fails or is otherwise unable to process a request.

The system 100 may comprise a control device 111. The control device 111 may be in communication with each device shown in the system 100. The control device 111 may monitor interactions/processes of the computing device 110A, the computing device 110B, and/or computing device 110C. As described further herein, the control device 111 may modify the manifest 160 to enable continuity of service in the event that either the computing device 110A or the computing device 110B fails or is otherwise unable to process a request.

Figure 2A:
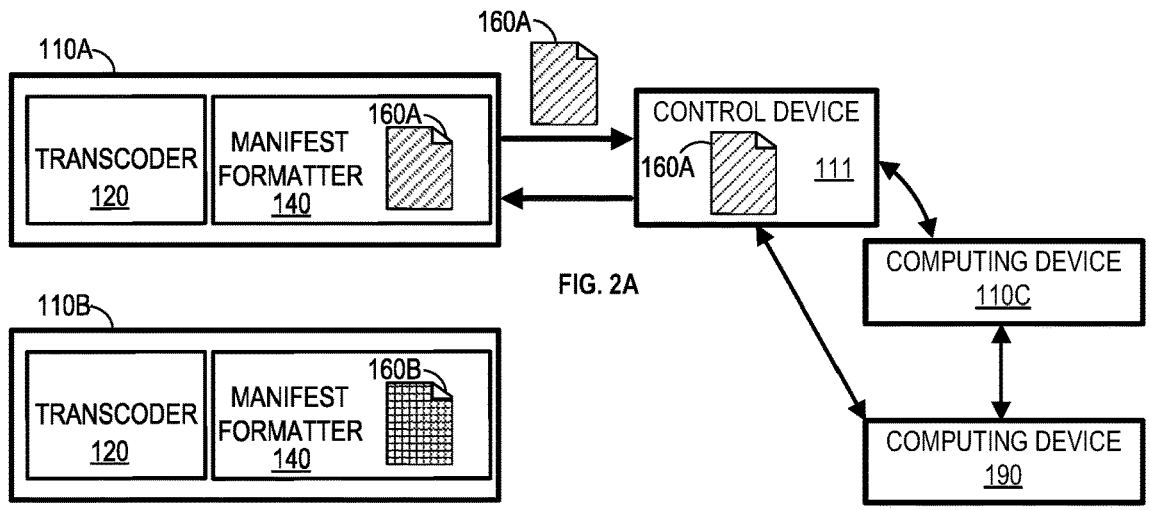
FIGS. 2A-2C show an example system.
Figure 2B:
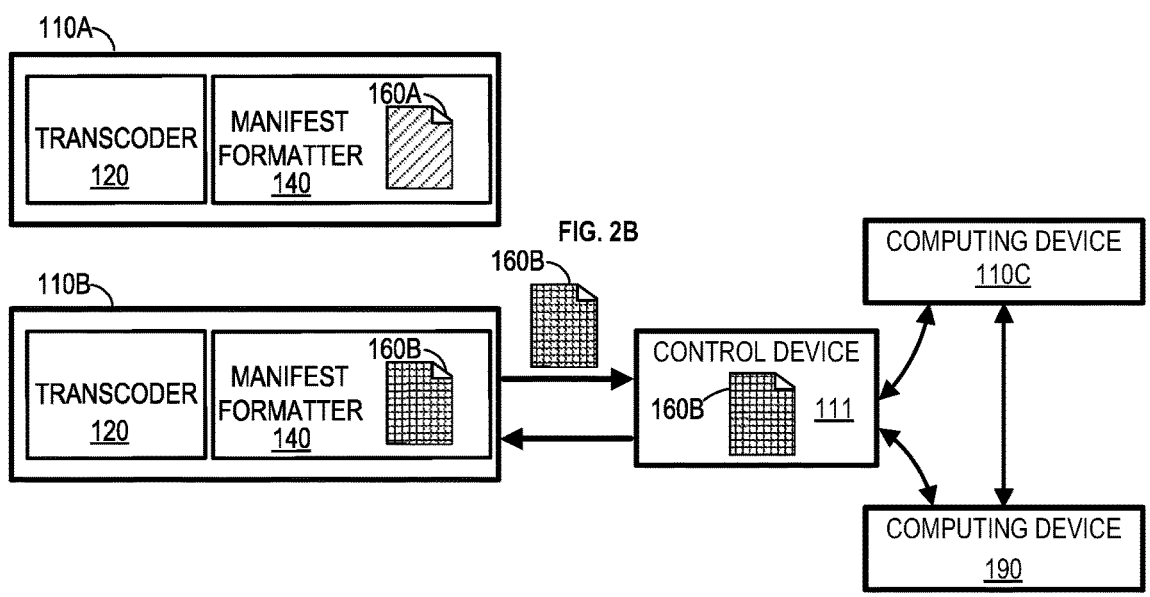
Figure 2C:
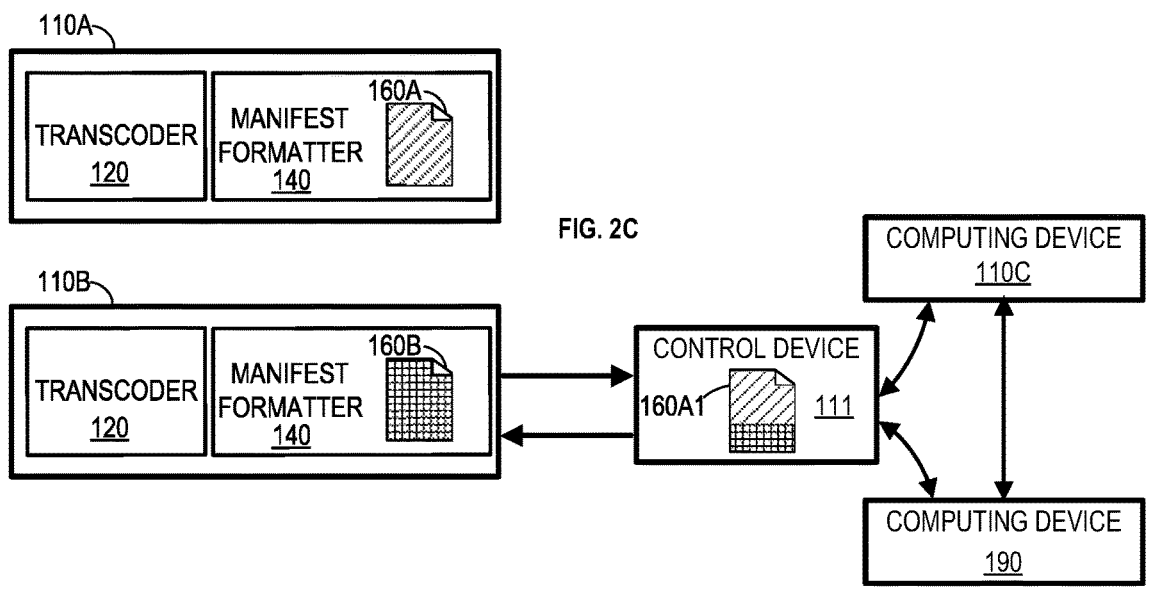

FIGS. 2A-2C show the computing devices 110A, 110B, and 110C as well as the control device 111 and the computing device 190 of the system 100. As described herein, and elaborated upon with respect to FIGS. 2A-2C, the system 100 may implement improved failover techniques to mitigate effects of a failure within the system 100. As shown in FIG. 2A, the control device 111 may receive a first manifest 160A for content requested by the computing device 190. The first manifest 160A may be generated by the manifest formatter 140 of the computing device 110A. The first manifest 160A may comprise a list of URLs that are specific to one or more segments of a source stream 102 of the content transcoded by the transcoder 120 of the computing device 110A.

The computing device 190 may use the first manifest 160A to generate requests for segments (e.g., portions) of the content. The first manifest 160A may indicate first timing data, such as a first presentation time stamp (PTS) associated with the transcoder 120 of the computing device 110A. The requests for segments (e.g., portions) of the content may be sent to the computing device 110C. The computing device 110C may receive corresponding transcoded segments of the content from the computing device 110A, prepare the transcoded segments for output by the computing device 190, and deliver the segments to the computing device 190. The first PTS may be used by the computing device 110C to determine at what point in time a particular segment requested by the computing device 190 is to be delivered—or otherwise made available to—the computing device 190.

The control device 111 may receive an indication of a disruption associated with the computing device 190 outputting (e.g., displaying, presenting, playing, etc.) the content. The disruption may be associated with a failure of the computing device 110A and/or a communication pathway between the computing device 110A and the computing device 190. For example, the indication of the disruption may comprise a message. The message may be received by the control device 111 from the computing device 190, the computing device 110C, and/or from another computing device in communication with the computing device 190. The message may indicate that at least one portion of the content is not available via the computing device 110A. The message may be indicative of at least one network error or condition associated with the computing device 110A. The network error or condition may indicate an amount of network bandwidth, an HTTP error code, an indication of a request(s) sent to the computing device 110A has timed out, a combination thereof, and/or the like.

The control device 111 may determine that the computing device 110B is available to serve requests for segments (e.g., portions) of the content. For example, the control device 111 may determine/identify the computing device 110B as part of a failover procedure. The failover procedure may be triggered in response to the control device 111 receiving the indication of the disruption. The control device 111 may determine that the computing device 110B is available to fulfill additional requests for segments (e.g., portions) of the content.

The computing device 110B may receive the content from an input source 102 (e.g., a mezzanine feed), generate segments of the content using the transcoder 120 of the computing device 110B, and generate a second manifest 160B for the content. The second manifest 160B may be generated by the manifest formatter 140 of the computing device 110B. The second manifest 160B may comprise a list of URLs that are specific to one or more segments of the input source stream 102 of the content transcoded by the transcoder 120 of the computing device 110B. The input source 102 used by the computing device 110B may have been used by the computing device 110A or it may be a separate input source 102.

The second manifest 160B may include second timing data indicating a second PTS associated with the transcoder 120 of the computing device 110B. The second timing data may differ at least partially from the first timing data. Sending the second manifest 160B directly to the computing device 190 may cause the computing device 190 to initiate a retuning procedure based on the differing second timing data in order to synchronize the computing device 190 and/or the computing device 110C according to the second manifest 160B.

Figure 3:
FIG. 3 shows an example data table.

To prevent the computing device 190 from requiring the retuning procedure, the control device 111 may modify the first manifest 160A and/or the second manifest 160B. For example, as shown in FIG. 2B, the control device 111 may receive at least one portion of the second manifest 160B from the computing device 110B. The content may be a linear content item (e.g., a live event), and the at least one portion of the second manifest 160B may correspond to a portion of the linear content item most recently transcoded by the transcoder 120 of the computing device 110B. The at least one portion of the second manifest 160B may comprise a Dynamic Adaptive Streaming over HTTP ("DASH") timing element, an HTTP Live Streaming ("HLS") timing element, a combination thereof, and/or the like. For example, the DASH timing element and/or the HLS timing element may be an "MPD@Period" element, as shown in FIG. 3. The "MPD@Period" element of the second manifest 160B may be indicative of the second PTS associated with the transcoder 120 of the computing device 110B. The DASH timing element and/or the HLS timing element may be, for example, a start number element, such as the "MPD@Period@AdaptationSet@SegmentTemplate@ StartNumber" element, as shown in FIG. 3, which may be an indicator of a numbering scheme for the content according to the HLS protocol.

The at least one portion of the second manifest 160B may comprise at least one identifier associated with at least one additional portion of the content as well as the second timing data associated with the computing device 110B. The at least one identifier associated with the at least one additional portion of the content may identify the computing device 110B (e.g., a URL that identifies the computing device 110B). The continuity module 113 of the control device 111 may determine replacement timing data. The replacement timing data may be a continuity element 164, shown in the manifest 160 in FIG. 1. The replacement timing data may be a DASH and/or HLS timing element (e.g., such as those shown in FIG. 3). The first timing data may be indicative of the first PTS associated with the computing device 110A, and the second timing data may be indicative of the second PTS associated with the computing device 110B. The control device 111 may determine the replacement timing data based on the first PTS and the second PTS. For example, the replacement timing data may indicate that the at least one additional portion of the content is associated with the first PTS despite the at least one additional portion being associated with the second PTS and the computing device 110B.

The replacement timing data may be based on timing data associated with the second manifest 160B associated with the content and the computing device 110B (e.g., the second timing data associated with the computing device 110B). For example, as shown in FIG. 2C, the control device 111 may modify at least one portion of the first manifest 160A based on the replacement timing data. For example, the control device 111 may append the first manifest 160A to include the at least one portion of the second manifest 160B and the replacement timing data. The at least one portion of the first manifest 160A, once appended, may be referred to herein as a "modified first manifest" 160A1, as shown in FIG. 2C. The modified first manifest 160A1 may comprise the at least one identifier associated with the at least one additional portion of the content and the replacement timing data. The control device 111 may send the modified first manifest 160A1 to the computing device 190. The computing device 190 may receive the modified first manifest 160A1. The modified first manifest 160A1 may facilitate the computing device 190 receiving the at least one additional portion of the content from the computing device 110B without requiring the retuning procedure.

The computing device 190 may generate a request for the at least one additional portion of the content based on the modified first manifest 160A1. For example, the computing device 190 may use the modified first manifest 160A1 to determine the at least one identifier associated with the at least one additional portion of the content. The request for the at least one additional portion of the content may comprise the at least one identifier. The computing device 190 may send the request for the at least one additional portion of the content to the computing device 110C. The computing device 110C may receive the request for the at least one additional portion of the content from the computing device 190.

The at least one identifier associated with the at least one additional portion of the content within the modified first manifest 160A1 may identify the computing device 110B. For example, the at least one identifier may be a URL that identifies the computing device 110B. Based on the at least one identifier, the computing device 110C may retrieve a transcoded segment(s) of the content corresponding to the at least one additional portion of the content from the computing device 110B. The computing device 110C may package the transcoded segment(s) of the content corresponding to the at least one additional portion of the content. The computing device 110C may send the segment(s) of the content corresponding to the at least one additional portion to the computing device 190. The computing device 190 may receive and cause output of the packaged segment(s) of the content corresponding to the at least one additional portion.

The second manifest 160B may comprise an HLS timing element. The computing device 190 may output the content according to the HLS communications protocol (e.g., an HTTP-based adaptive bitrate streaming protocol). The first timing data may be first period data associated with a first playback period (e.g., an HLS and/or DASH period). The first playback period may be indicated by an MPD@Period of the first manifest 160A. The second timing data may be associated with a second playback period (e.g., an HLS and/or DASH period). The second playback period may be indicated by an MPD@Period of the second manifest 160B. The first timing data may comprise a first identifier for a first segment of the content within the first playback period. The first identifier for the first segment of the content within the first playback period may be a first DASH/HLS element (e.g., a first "StartNumber" element). For example, the first DASH/HLS element may be a start number element, such as an MPD@Period@AdaptationSet@SegmentTemplate@StartNumber element within the first manifest 160A. The second timing data may comprise a first identifier for a first segment of the content within the second playback period. The first identifier for the first segment of the content within the second playback period may be a second DASH/HLS element (e.g., a second "StartNumber" element). For example, the second DASH/HLS element may be a start number element, such as an MPD@Period@AdaptationSet@SegmentTemplate@StartNumber element within the second manifest 160B. A value (e.g., a StartNumber value) of the first DASH/HLS element may differ at least partially from a value (e.g., a StartNumber value) of the second DASH/HLS element.

The replacement timing data within the modified first manifest 160A1 may comprise replacement period data. The replacement period data may be determined by the control device 111 based on the first playback period and the second playback period. For example, the replacement period data may comprise a continuity element 164. The continuity element 164 may be a DASH/HLS element (e.g., a StartNumber value) associated with the at least one additional portion of the content. The continuity element 164 may correspond to the first playback period. The control device 111 may determine the continuity element 164 by renumbering a StartNumber value associated with the at least one additional portion of the content based on the second DASH/HLS element within the second manifest 160B.

The control device 111 may modify the at least one portion of the first manifest 160A, which is shown in FIG. 2C as the modified first manifest 160A1. The modified first manifest 160A1 may comprise the continuity element 164. The modified first manifest 160A1 may enable the computing device 190 to request and output the at least one additional portion of the content according to the HLS communications protocol without requiring the retuning procedure. For example, the computing device 190 may receive the modified first manifest 160A1. The computing device 190 may parse the modified first manifest 160A1 and determine that the replacement period data and/or the continuity element 164 matches expected period data (e.g., the first playback period). The continuity element 164 may therefore enable the computing device 190 to request and output the at least one additional portion of the content without requiring the retuning procedure.

Figure 4:
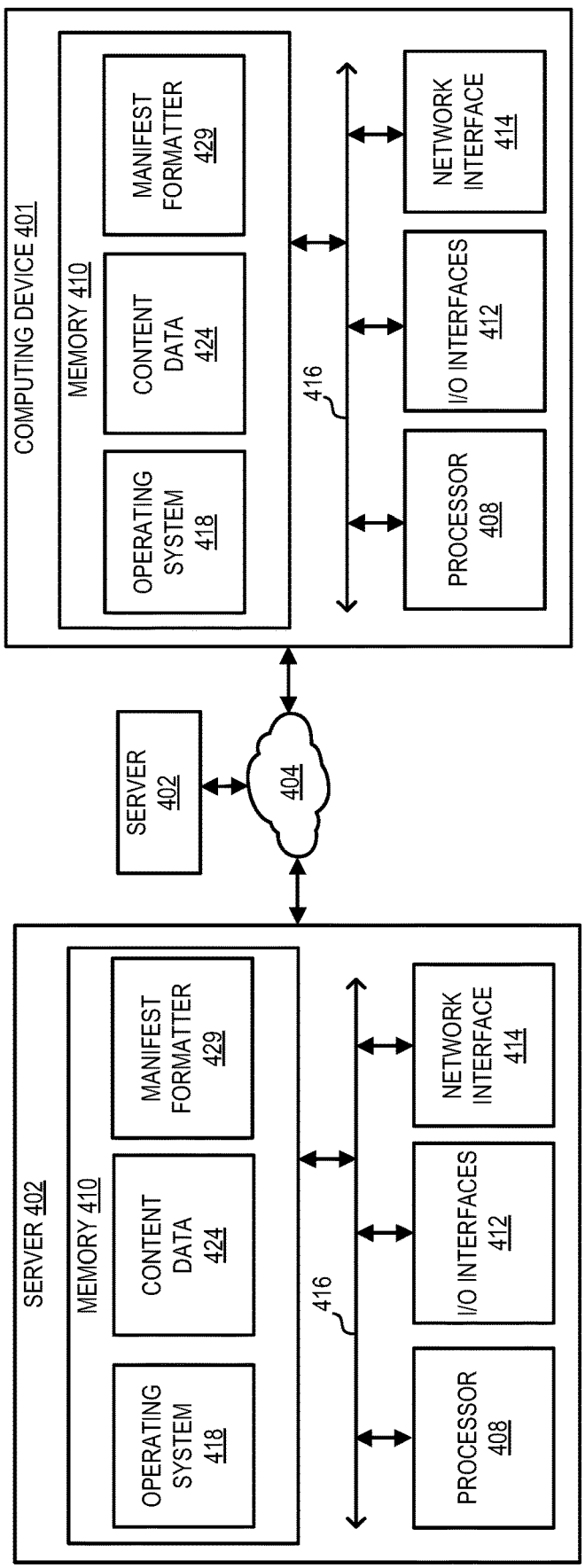
FIG. 4 shows an example system.

The present methods and systems may be computer-implemented. FIG. 4 shows a block diagram depicting a system/environment 400 comprising non-limiting examples of a computing device 401 and a server 402 connected through a network 404. Either of the computing device 401 or the server 402 may be a computing device, such as any of the computing devices 110A, 110B, and 110C as well as the control device 111 or the computing device 190 of the system 100 shown in FIG. 1. In an aspect, some or all steps of any described method may be performed on a computing device as described herein. The computing device 401 may comprise one or multiple computers configured to store one or more of a manifest formatter 429, and/or the like. The server 402 may comprise one or multiple computers configured to store content data 424 (e.g., a plurality of content segments). Multiple servers 402 may communicate with the computing device 401 via the through the network 404.

The computing device 401 and the server 402 may be a digital computer that, in terms of hardware architecture, generally includes a processor 408, system memory 810, input/output (I/O) interfaces 412, and network interfaces 414. These components (408, 410, 412, and 414) are communicatively coupled via a local interface 416. The local interface 416 may be, for example, but not limited to, one or more buses or other wired or wireless connections, as is known in the art. The local interface 416 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 408 may be a hardware device for executing software, particularly that stored in system memory 410. The processor 408 may be any custom made or commercially available processor, a central processing unit (CPU), an auxiliary processor among several processors associated with the computing device 401 and the server 402, a semiconductor-based microprocessor (in the form of a microchip or chip set), or generally any device for executing software instructions. During operation of the computing device 401 and/or the server 402, the processor 408 may execute software stored within the system memory 410, to communicate data to and from the system memory 410, and to generally control operations of the computing device 401 and the server 402 pursuant to the software.

The I/O interfaces 412 may be used to receive user input from, and/or for sending system output to, one or more devices or components. User input may be received via, for example, a keyboard and/or a mouse. System output may be output via a display device and a printer (not shown). I/O interfaces 412 may include, for example, a serial port, a parallel port, a Small Computer System Interface (SCSI), an infrared (IR) interface, a radio frequency (RF) interface, and/or a universal serial bus (USB) interface.

The network interface 414 may be used to transmit and receive from the computing device 401 and/or the server 402 on the network 404. The network interface 414 may include, for example, a 10BaseT Ethernet Adaptor, a 10BaseT Ethernet Adaptor, a LAN PHY Ethernet Adaptor, a Token Ring Adaptor, a wireless network adapter (e.g., WiFi, cellular, satellite), or any other suitable network interface device. The network interface 414 may include address, control, and/or data connections to enable appropriate communications on the network 404.

The system memory 410 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 410 may incorporate electronic, magnetic, optical, and/or other types of storage media. Note that the system memory 410 may have a distributed architecture, where various components are situated remote from one another, but may be accessed by the processor 408.

The software in system memory 410 may include one or more software programs, each of which comprises an ordered listing of executable instructions for implementing logical functions. In the example of FIG. 4, the software in the system memory 410 of the computing device 401 may comprise the manifest formatter 429, the content data 424, and a suitable operating system (O/S) 418. In the example of FIG. 4, the software in the system memory 410 of the server 402 may comprise the manifest formatter 429, the content data 424, and a suitable operating system (O/S) 418. The operating system 418 essentially controls the execution of other computer programs and enables scheduling, input-output control, file and data management, memory management, and communication control and related services.

For purposes of illustration, application programs and other executable program components such as the operating system 418 are shown herein as discrete blocks, although it is recognized that such programs and components may reside at various times in different storage components of the computing device 401 and/or the server 402. An implementation of the system/environment 400 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 5:
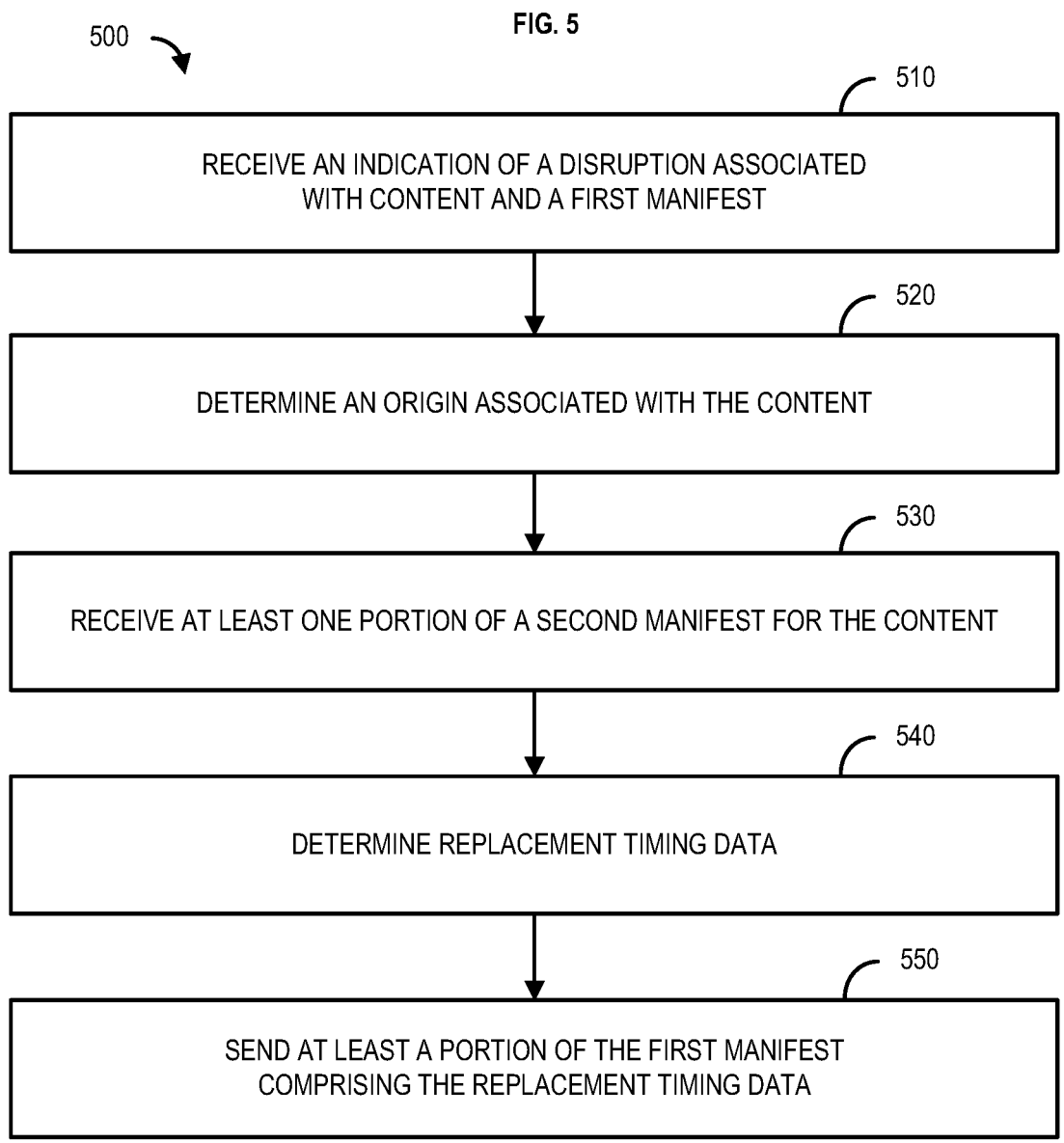
FIG. 5 shows a flowchart for an example method.

FIG. 5 shows a flowchart of an example method 500 for improved failover techniques. The method 500 may be performed in whole or in part by a single computing device, a plurality of computing devices, and the like. For example, the steps of the method 500 may be performed by the control device 111 shown in FIG. 1. Some steps of the method 500 may be performed by one computing device (e.g., the control device 111), while other steps of the method 500 may be performed by another computing device.

A first computing device may receive a first manifest for content (e.g., the first manifest 160A) requested by a second computing device. The first computing device may be a control device, such as the control device 111. The second computing device may be a media device, a user device, a mobile device, etc., such as the computing device 190. The first manifest may be generated by a manifest formatter of a first origin computing device, such as the computing device 110A. The first manifest may comprise a list of URLs that are specific to one or more segments of a source stream of the content that is transcoded by a transcoder of the first origin computing device.

The second computing device may use the first manifest to generate requests for segments (e.g., portions) of the content. The first manifest may indicate first timing data, such as a first presentation time stamp (PTS) associated with the transcoder of the first origin computing device. The requests for segments (e.g., portions) of the content may be sent by the second computing device to the first computing device. A packaging device may receive corresponding transcoded segments of the content from the first origin computing device, prepare the transcoded segments for output by the second computing device, and deliver the segments to the second computing device. The first PTS may be used by the first origin computing device to determine at what point in time a particular segment requested by the second computing device is to be delivered—or otherwise made available to—the second computing device.

At step 510, the first computing device may receive an indication of a disruption. The disruption may be associated with the second computing device outputting (e.g., displaying, presenting, playing, etc.) the content. The disruption may be associated with a failure of the first origin computing device and/or a communication pathway between the first origin computing device and the second computing device. For example, the indication of the disruption may comprise a message. The message may be received by the first computing device from the second computing device, the first origin computing device, and/or from another computing device in communication with the second computing device. The message may indicate that at least one portion of the content is not available via the first origin computing device. The message may be indicative of at least one network error or condition associated with the first origin computing device. The network error or condition may indicate an amount of network bandwidth, an HTTP error code, an indication of a request(s) sent to the first origin computing device has timed out, a combination thereof, and/or the like.

At step 520, the first computing device may determine another origin associated with the content. For example, the first computing device may determine that a second origin computing device, such as the computing device 110B, is available to serve requests for segments (e.g., portions) of the content. The first computing device may determine/identify the second origin computing device as part of a failover procedure. The failover procedure may be triggered in response to the first computing device receiving the indication of the disruption. The first computing device may determine that the second origin computing device is available to fulfill additional requests for segments (e.g., portions) of the content.

The second origin computing device may receive the content from an input source (e.g., a mezzanine feed), generate segments of the content using a transcoder, and generate a second manifest for the content (e.g., the second manifest 160B). The second manifest may be generated by a manifest formatter of the second origin computing device. The second manifest may comprise a list of URLs that are specific to one or more segments of the input source stream of the content transcoded by the transcoder of the second origin computing device. The input source used by the second origin computing device may have been used by the first origin computing device or it may be a separate input source. The second manifest may include second timing data indicating a second PTS associated with the transcoder of the second origin computing device. The second timing data may differ at least partially from the first timing data.

To prevent the second computing device from requiring a retuning procedure, the first computing device may modify the first manifest and/or the second manifest. At step 530, the first computing device may receive at least one portion of the second manifest. For example, the first computing device may receive the at least one portion of the second manifest from the second origin computing device. The at least one portion of the second manifest may comprise a Dynamic Adaptive Streaming over HTTP ("DASH") timing element, an HTTP Live Streaming ("HLS") timing element, a combination thereof, and/or the like. For example, the DASH timing element and/or the HLS timing element may be an "MPD@Period" element. The "MPD@Period" element of the second manifest may be indicative of the second PTS associated with the transcoder of the second origin computing device. The DASH timing element and/or the HLS timing element may be, for example, as start number element, such an "MPD@Period@AdaptationSet@ SegmentTemplate@StartNumber" element, which may be an indicator of a numbering scheme for the content according to the HLS protocol.

The at least one portion of the second manifest may comprise at least one identifier associated with at least one additional portion of the content as well as the second timing data associated with the second origin computing device. The at least one identifier associated with the at least one additional portion of the content may identify the second origin computing device (e.g., a URL that identifies the second origin computing device). At step 540, the first computing device may determine replacement timing data. The first computing device may determine the replacement timing data based on the first manifest and the at least one portion of the second manifest. A continuity module of the first computing device may determine the replacement timing data. The replacement timing data may be a continuity element, such as the continuity element 164 shown in the manifest 160 in FIG. 1. The replacement timing data may be a DASH and/or HLS timing element (e.g., such as those shown in FIG. 3). The replacement timing data may at least partially differ from the first timing data. The first timing data may be indicative of the first PTS associated with the first origin computing device, and the second timing data may be indicative of the second PTS associated with the second origin computing device. The first computing device may determine the replacement timing data based on the first PTS and the second PTS. For example, the replacement timing data may indicate that the at least one additional portion of the content is associated with the first PTS despite the at least one additional portion being associated with the second PTS and the second origin computing device.

The first computing device may append the replacement timing data to the first manifest. For example, the first computing device may modify at least one portion of the first manifest based on the replacement timing data, and the first computing device may append the first manifest to include the at least one portion of the second manifest and the replacement timing data. The at least one portion of the first manifest, once appended, may be referred to herein as a "modified first manifest," such as the first manifest 160A1 shown in FIG. 2C. The modified first manifest may comprise the at least one identifier associated with the at least one additional portion of the content and the replacement timing data. At step 550, the first computing device may send at least one portion of the first manifest to the second computing device. The first computing device may send the at least one portion of the first manifest comprising the replacement timing data to the second computing device. For example, the first computing device may send the modified first manifest to the second computing device. The second computing device may receive the modified first manifest. The modified first manifest may facilitate the second computing device receiving the at least one additional portion of the content from the second origin computing device without requiring the retuning procedure.

The second computing device may generate a request for the at least one additional portion of the content based on the modified first manifest. For example, the second computing device may use the modified first manifest (e.g., the at least one portion of the first manifest and the replacement timing data) to determine the at least one identifier associated with the at least one additional portion of the content. The request for the at least one additional portion of the content may comprise the at least one identifier. The second computing device may send the request for the at least one additional portion of the content to the packaging device. The packaging device may receive the request for the at least one additional portion of the content from the second computing device.

The at least one identifier associated with the at least one additional portion of the content within the modified first manifest may identify the second origin computing device (e.g., a URL that identifies the second origin computing device). Based on the at least one identifier, the packaging device may retrieve a transcoded segment(s) of the content corresponding to the at least one additional portion of the content from the second origin computing device. The packaging device may package the transcoded segment(s) of the content corresponding to the at least one additional portion of the content. The packaging device may send the segment(s) of the content corresponding to the at least one additional portion to the second computing device. The second computing device may receive and cause output of the packaged segment(s) of the content corresponding to the at least one additional portion.

FIG. 6 shows a flowchart of an example method 600 for improved failover techniques. The method 600 may be performed in whole or in part by a single computing device, a plurality of computing devices, and the like. For example, the steps of the method 600 may be performed the control device 111 shown in FIG. 1. Some steps of the method 600 may be performed by one computing device (e.g., the control device 111), while other steps of the method 600 may be performed by another computing device.

A first computing device may receive a first manifest for content (e.g., the first manifest 160A) requested by a second computing device. The first computing device may be a control device, such as the control device 111. The second computing device may be a media device, a user device, a mobile device, etc., such as the computing device 190. The first manifest may be generated by a manifest formatter of a first origin computing device, such as the computing device 110A. The first manifest may comprise a list of URLs that are specific to one or more segments of a source stream of the content that is transcoded by a transcoder of the first origin computing device.

The second computing device may use the first manifest to generate requests for segments (e.g., portions) of the content. The first manifest may indicate first timing data, such as a first presentation time stamp (PTS) associated with the transcoder of the first origin computing device. The requests for segments (e.g., portions) of the content may be sent by the second computing device to the first computing device. The first computing device may receive corresponding transcoded segments of the content from the first origin computing device, prepare the transcoded segments for output by the second computing device, and deliver the segments to the second computing device. The first PTS may be used by the first origin computing device to determine at what point in time a particular segment requested by the second computing device is to be delivered—or otherwise made available to—the second computing device.

At step 610, the first computing device may receive an indication of a disruption. The disruption may be associated with the second computing device outputting (e.g., displaying, presenting, playing, etc.) the content. The disruption may be associated with a failure of the first origin computing device and/or a communication pathway between the first origin computing device and the second computing device. For example, the indication of the disruption may comprise a message. The message may be received by the first computing device from the second computing device, the first origin computing device, and/or from another computing device in communication with the second computing device. The message may indicate that at least one portion of the content is not available via the first origin computing device. The message may be indicative of at least one network error or condition associated with the first origin computing device. The network error or condition may indicate an amount of network bandwidth, an HTTP error code, an indication of a request(s) sent to the first origin computing device has timed out, a combination thereof, and/or the like.

The first computing device may determine that a second origin computing device, such as the computing device 110B, is available to serve requests for segments (e.g., portions) of the content. For example, the first computing device may determine/identify the second origin computing device as part of a failover procedure. The failover procedure may be triggered in response to the first computing device receiving the indication of the disruption. The first computing device may determine that the second origin computing device is available to fulfill additional requests for segments (e.g., portions) of the content.

The second origin computing device may receive the content from an input source (e.g., a mezzanine feed), generate segments of the content using a transcoder, and generate a second manifest for the content (e.g., the second manifest 160B). The second manifest may be generated by a manifest formatter of the second origin computing device. The second manifest may comprise a list of URLs that are specific to one or more segments of the input source stream of the content transcoded by the transcoder of the second origin computing device. The input source used by the second origin computing device may have been used by the first origin computing device or it may be a separate input source. The second manifest may include second timing data indicating a second PTS associated with the transcoder of the second origin computing device. The second timing data may differ at least partially from the first timing data.

At step 620, the first computing device may determine first period data and second period data. The first period data may be associated with the first origin computing device and the first manifest. The second period data may be associated with the second origin computing device and the second manifest. The second manifest may comprise an HLS timing element. The second computing device may output the content according to the HLS communications protocol (e.g., an HTTP-based adaptive bitrate streaming protocol). The first timing data may comprise the first period data. The first period data may be associated with a first playback period (e.g., an HLS and/or DASH period). The first playback period may be indicated by an MPD@Period of the first manifest. The second timing data may comprise second period data. The second period data may be associated with a second playback period (e.g., an HLS and/or DASH period). The second playback period may be indicated by an MPD@Period of the second manifest. The first timing data may comprise a first identifier for a first segment of the content within the first playback period. The first identifier for the first segment of the content within the first playback period may be a first DASH/HLS element (e.g., a first "StartNumber" element). For example, the first DASH/HLS element may be a start number element, such as an MPD@Period@ AdaptationSet@SegmentTemplate @StartNumber element within the first manifest. The second timing data may comprise a first identifier for a first segment of the content within the second playback period. The first identifier for the first segment of the content within the second playback period may be a second DASH/HLS element (e.g., a second "StartNumber" element). For example, the second DASH/HLS element may be a start number element, such as an MPD@Period@AdaptationSet@Segment Template@StartNumber element within the second manifest. A value (e.g., a StartNumber value) of the first DASH/HLS element may differ at least partially from a value (e.g., a StartNumber value) of the second DASH/HLS element.

To prevent the second computing device from requiring a retuning procedure, the first computing device may modify the first manifest and/or the second manifest. The first computing device may receive at least one portion of the second manifest from the second origin computing device. The at least one portion of the second manifest may comprise a Dynamic Adaptive Streaming over HTTP ("DASH") timing element, an HTTP Live Streaming ("HLS") timing element, a combination thereof, and/or the like. For example, the DASH timing element and/or the HLS timing element may be an "MPD@Period" element. The "MPD@Period" element of the second manifest may be indicative of the second PTS associated with the transcoder of the second origin computing device. The DASH timing element and/or the HLS timing element may be, for example, a start number element, such as an "MPD@Period@AdaptationSet@SegmentTemplate@ StartNumber" element, which may be an indicator of a numbering scheme for the content according to the HLS protocol.

At step 630, the first computing device may determine replacement period data. For example, a continuity module of the first computing device may determine the replacement period data based on the at least one portion of the second manifest. The replacement period data may be determined by the first computing device based on the first playback period and the second playback period. The replacement period data may comprise a starting position (e.g., a StartNumber value) for at least one additional portion of the content based on the second playback period (e.g., the second period data). For example, the replacement period data may comprise a continuity element. The continuity element may be a DASH/HLS element (e.g., a StartNumber value) associated with the at least one additional portion of the content. The continuity element may correspond to the first playback period. The first computing device may determine the continuity element by renumbering a StartNumber value associated with the at least one additional portion of the content based on the second DASH/HLS element within the second manifest.

The first computing device may append the replacement period data to the first manifest. For example, the first computing device may modify at least one portion of the first manifest based on the replacement period data, and the first computing device may append the first manifest to include the at least one portion of the second manifest and the replacement period data. The at least one portion of the first manifest, once appended, may be referred to herein as a "modified first manifest," such as the first manifest 160A1 shown in FIG. 2C. The modified first manifest may comprise the continuity element. The modified first manifest may enable the second computing device to request and output the at least one additional portion of the content according to the HLS communications protocol without requiring a retuning procedure. At step 640, the first computing device may send the modified first manifest (e.g., the at least one portion of the first manifest comprising the replacement period data) to the second computing device. The modified first manifest may cause the second computing device to receive the at least one additional portion of the content via the second origin computing device. For example, the second computing device may receive the modified first manifest. The second computing device may parse the modified first manifest and determine that the replacement period data and/or the continuity element matches expected period data (e.g., the first playback period). The continuity element may therefore enable the second computing device to request and output the at least one additional portion of the content without requiring the retuning procedure.

FIG. 7 shows a flowchart of an example method 700 for improved failover techniques. The method 700 may be performed in whole or in part by a single computing device, a plurality of computing devices, and the like. For example, the steps of the method 700 may be performed the computing device 190 shown in FIG. 1. Some steps of the method 700 may be performed by one computing device (e.g., the computing device 190), while other steps of the method 700 may be performed by another computing device.

A first computing device may request a first manifest for content. The first computing device may be a media device, a user device, a mobile device, etc., such as the computing device 190. A second computing device may receive the first manifest for the content (e.g., the first manifest 160A) requested by the first computing device. The second computing device may be a control device, such as the control device 111. The first manifest may be generated by a manifest formatter of a first origin computing device, such as the computing device 110A. The first manifest may comprise a list of URLs that are specific to one or more segments of a source stream of the content that is transcoded by a transcoder of the first origin computing device.

At step 710, the first computing device may receive a first portion of the first manifest for the content. For example, the second computing device may send the first portion of the first manifest to the first computing device. The first computing device may use the first portion of the first manifest to generate requests for segments (e.g., portions) of the content. The first portion of the first manifest may indicate first timing data, such as a first presentation time stamp (PTS) associated with the transcoder of the first origin computing device. The requests for segments (e.g., portions) of the content may be sent by the first computing device to the second computing device. A packaging device may receive corresponding transcoded segments of the content from the first origin computing device, prepare the transcoded segments for output by the first computing device, and deliver the segments to the first computing device. The first PTS may be used by the first origin computing device to determine at what point in time a particular segment requested by the first computing device is to be delivered—or otherwise made available to—the first computing device.

At step 720, the first computing device may cause a first portion of the content received from the packaging device and the first origin computing device to be output. A disruption associated with the first computing device outputting (e.g., displaying, presenting, playing, etc.) the content may occur. The disruption may be associated with a failure of the first origin computing device and/or a communication pathway between the first origin computing device and the first computing device. For example, the first computing device may receive at least one network error or condition associated with the first origin computing device. The network error or condition may indicate an amount of network bandwidth, an HTTP error code, an indication of a request(s) sent to the first origin computing device has timed out, a combination thereof, and/or the like. At step 730, the first computing device may send an indication of the disruption. For example, the first computing device may send a message indicating the disruption. The first computing device may send the message to the second computing device or to another computing device in communication with the second computing device. The message may be received by the second computing device directly from the first computing device, via the first origin computing device, and/or via another computing device in communication with the first computing device. The message may indicate that at least one portion of the content is not available via the first origin computing device. The message may be indicative of the at least one network error or condition associated with the first origin computing device.

The second computing device may determine that a second origin computing device, such as the computing device 110B, is available to serve requests for segments (e.g., portions) of the content. For example, the second computing device may determine/identify the second origin computing device as part of a failover procedure. The failover procedure may be triggered in response to the second computing device receiving the indication of the disruption. The second computing device may determine that the second origin computing device is available to fulfill additional requests for segments (e.g., portions) of the content.

The second origin computing device may receive the content from an input source (e.g., a mezzanine feed), generate segments of the content using a transcoder, and generate a second manifest for the content (e.g., the second manifest 160B). The second manifest may be generated by a manifest formatter of the second origin computing device. The second manifest may comprise a list of URLs that are specific to one or more segments of the input source stream of the content transcoded by the transcoder of the second origin computing device. The input source used by the second origin computing device may have been used by the first origin computing device or it may be a separate input source. The second manifest may include second timing data indicating a second PTS associated with the transcoder of the second origin computing device. The second timing data may differ at least partially from the first timing data.

To prevent the first computing device from requiring a retuning procedure, the second computing device may modify the first manifest and/or the second manifest. For example, the second computing device may receive at least one portion of the second manifest from the second origin computing device. The at least one portion of the second manifest may comprise a Dynamic Adaptive Streaming over HTTP ("DASH") timing element, an HTTP Live Streaming ("HLS") timing element, a combination thereof, and/or the like. For example, the DASH timing element and/or the HLS timing element may be an "MPD@Period" element. The "MPD@Period" element of the second manifest may be indicative of the second PTS associated with the transcoder of the second origin computing device. The DASH timing element and/or the HLS timing element may be, for example, a start number element, such as an "MPD@Period@AdaptationSet @SegmentTemplate@StartNumber" element, which may be an indicator of a numbering scheme for the content according to the HLS protocol.

The at least one portion of the second manifest may comprise at least one identifier associated with at least one additional portion of the content as well as the second timing data associated with the second origin computing device. The at least one identifier associated with the at least one additional portion of the content may identify the second origin computing device (e.g., a URL that identifies the second origin computing device). A continuity module of the second computing device may determine replacement timing data. The replacement timing data may be a continuity element, such as the continuity element 164 shown in the manifest 160 in FIG. 1. The replacement timing data may be a DASH and/or HLS timing element (e.g., such as those shown in FIG. 3). The first timing data may be indicative of the first PTS associated with the first origin computing device, and the second timing data may be indicative of the second PTS associated with the second origin computing device. The second computing device may determine the replacement timing data based on the first PTS and the second PTS. For example, the replacement timing data may indicate that the at least one additional portion of the content is associated with the first PTS despite the at least one additional portion of the content being associated with the second PTS and the second origin computing device. The replacement timing data may comprise a starting position (e.g., a StartNumber value) for the at least one additional portion of the content. For example, the replacement timing data may comprise a starting position for the at least one additional portion of the content based on the first timing data and the second timing data.

The second computing device may append timing data to the first manifest. For example, the second computing device may modify at least one portion of the first manifest based on the replacement timing data, and the second computing device may append the first manifest to include the at least one portion of the second manifest and the replacement timing data. The at least one portion of the first manifest, once appended, may be referred to herein as a "modified first manifest," such as the first manifest 160A1 shown in FIG. 2C. The modified first manifest may comprise the at least one identifier associated with the at least one additional portion of the content and the replacement timing data. The second computing device may send at least one portion of the first manifest comprising the replacement timing data. At step 740, the first computing device may receive a second portion of the first manifest. The second portion of the first manifest may comprise the modified first manifest. The modified first manifest may facilitate the first computing device receiving the at least one additional portion of the content from the second origin computing device without requiring the retuning procedure.

The first computing device may generate a request for the at least one additional portion of the content based on the modified first manifest. For example, the first computing device may use the modified first manifest to determine the at least one identifier associated with the at least one additional portion of the content. The request for the at least one additional portion of the content may comprise the at least one identifier. At step 750, the first computing device may send the request for the at least one additional portion of the content. For example, the first computing device may send the request for the at least one additional portion of the content to the second origin computing device and/or to a packaging device. The packaging device may receive the request for the at least one additional portion of the content from the first computing device.

The at least one identifier associated with the at least one additional portion of the content within the modified first manifest may identify the second origin computing device (e.g., a URL that identifies the second origin computing device). Based on the at least one identifier, the packaging device may retrieve a transcoded segment(s) of the content corresponding to the at least one additional portion of the content from the second origin computing device. The packaging device may package the transcoded segment(s) of the content corresponding to the at least one additional portion of the content. The packaging device may send the segment(s) of the content corresponding to the at least one additional portion to the first computing device. The first computing device may receive the packaged segment(s) of the content corresponding to the at least one additional portion. At step 760, the first computing device may cause output of the at least one additional portion of the content. For example, the first computing device may cause output of the packaged segment(s) of the content corresponding to the at least one additional portion.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving, by a first computing device, an indication of a disruption associated with at least one portion of content requested by a second computing device, via a first origin computing device, according to a first manifest associated with the first origin computing device;
determining, based on the disruption, a second origin computing device associated with the content;
receiving, via the second origin computing device, at least one portion of a second manifest associated with the content;
modifying, based on the first manifest and the at least one portion of the second manifest, at least one portion of the first manifest to include replacement timing data; and
sending, to the second computing device, the modified at least one portion of the first manifest comprising the replacement timing data, wherein the modified at least one portion of the first manifest and the replacement timing data cause the second computing device to receive the at least one portion of the content via the second origin computing device.

2. The method of claim 1, wherein receiving the indication of the disruption comprises at least one of:
receiving, via the second computing device, a message indicating that the at least one portion of the content is not available;
receiving, via the second computing device, a message comprising at least one network error associated with the first origin computing device; or
receiving a message indicating a request to communicate with the first origin computing device has timed out.

3. The method of claim 1, wherein modifying the at least one portion of the first manifest to include the replacement timing data comprises:
determining, based on first timing data associated with the first origin computing device, and based on second timing data associated with the second origin computing device, the replacement timing data; and
appending, to the at least one portion of the first manifest, the replacement timing data, wherein the replacement timing data at least partially differs from the first timing data.

4. The method of claim 3, wherein determining the replacement timing data comprises:
determining, based on a first presentation time stamp (PTS) indicated by the first timing data, and based on a second PTS indicated by the second timing data, the replacement timing data, wherein the second timing data is indicative of the at least one portion of the content being associated with the second PTS; and
appending, to the at least one portion of the first manifest, the replacement timing data, wherein the replacement timing data is indicative of the at least one portion of the content being associated with the first PTS.

5. The method of claim 4, wherein the first PTS is associated with a transcoder of the first origin computing device, and wherein the second PTS is associated with a transcoder of the second origin computing device.

6. The method of claim 1, further comprising:
sending, by the second computing device, and based on the at least one portion of the first manifest and the replacement timing data, a request for the at least one portion of the content; and
receiving, by the second computing device via the second origin computing device, the at least one portion of the content.

7. The method of claim 1, wherein modifying the at least one portion of the first manifest to include the replacement timing data comprises:
determining first period data associated with the first origin computing device and the first manifest;
determining second period data associated with the second origin computing device and the second manifest;
determining, based on the first period data and the second period data, replacement period data for a portion of the content, wherein the replacement timing data comprises the replacement period data; and
appending, to the at least one portion of the first manifest, the replacement timing data.

8. A method comprising:
receiving, by a first computing device, an indication of a disruption associated with at least one portion of content requested by a second computing device, via a first origin computing device, according to a first manifest associated with the first origin computing device;
determining, based on the disruption:
first period data associated with the first origin computing device and the first manifest, and
second period data associated with a second origin computing device and a second manifest associated with the content and the second origin computing device;
modifying, based on the first period data and the second period data, at least one portion of the first manifest to include replacement period data; and
sending, to the second computing device, the modified at least one portion of the first manifest comprising the replacement period data, wherein the modified at least one portion of the first manifest and the replacement period data cause the second computing device to receive the at least one portion of the content via the second origin computing device.

9. The method of claim 8, wherein receiving the indication of the disruption comprises at least one of:
receiving, via the second computing device, a message indicating that the content is not available via the first origin computing device;
receiving, via the second computing device, a message comprising at least one network error associated with the first origin computing device; or
receiving a message indicating a request to communicate with the first origin computing device has timed out.

10. The method of claim 8, wherein the replacement period data comprises a starting position for the at least one portion of the content based on the second period data.

11. The method of claim 8, wherein the first period data comprises a starting position for the at least one portion of the content that at least partially differs from a starting position for the at least one portion of the content indicated by the second period data.

12. The method of claim 8, further comprising:
appending, to the at least one portion of the first manifest, the replacement period data.

13. The method of claim 8, wherein the at least one portion of the first manifest comprises at least one HTTP Live Streaming (HLS) timing element.

14. The method of claim 8, further comprising:
receiving, from the first origin computing device prior to the disruption, a second portion of the first manifest; and
sending, to the second computing device prior to the disruption, the second portion of the first manifest, wherein the second portion of the first manifest causes the second computing device to receive, prior to the disruption, the content via the first origin computing device.

15. A method comprising:
receiving, by a first computing device, a first portion of a first manifest associated with at least one portion of content, wherein the first manifest is associated with a first origin computing device;
causing, based on the first portion of the first manifest, output of the at least one portion of the content received via the first origin computing device;
sending, to a second computing device, an indication of a disruption associated with the content;
receiving a second portion of the first manifest, wherein the second portion of the first manifest comprises a modified first manifest, wherein the first manifest is modified to include replacement timing data based on the first manifest and timing data associated with a second manifest associated with the content and a second origin computing device;

sending, based on the second portion of the first manifest and the replacement timing data, a request for an additional portion of the content; and causing output of the additional portion of the content.

16. The method of claim 15, wherein the indication of the disruption comprises at least one of:
   a message indicating that the content is not available via the first origin computing device;
   a message comprising at least one network error associated with the first origin computing device; or
   a message indicating a request to communicate with the first origin computing device has timed out.

17. The method of claim 15, wherein the second manifest comprises at least one of: a Dynamic Adaptive Streaming over HTTP timing element or an HTTP Live Streaming timing element.

18. The method of claim 15, wherein the first portion of the first manifest comprises first timing data associated with the first origin computing device, wherein the second computing device determines the replacement timing data based on a first presentation time stamp (PTS) indicated by the first timing data and based on a second PTS indicated by the timing data associated with the second origin computing device, wherein the timing data associated with the second origin computing device is indicative of the additional portion of the content being associated with the second PTS, and wherein the replacement timing data comprises a timing element indicative of the additional portion of the content being associated with the first PTS.

19. The method of claim 18, wherein the first PTS is associated with a transcoder of the first origin computing device, and wherein the second PTS is associated with a transcoder of the second origin computing device.

20. The method of claim 18, wherein the replacement timing data comprises replacement period data comprising a starting position for the additional portion of the content based on the first timing data and the timing data associated with the second origin computing device.

* * * * *